(12) United States Patent
Gudme (10) Patent No.: US 7,923,126 B2
(45) Date of Patent: Apr. 12, 2011

(54) USE OF A STEEL COMPOSITION FOR THE PRODUCTION OF AN ARMOURING LAYER OF A FLEXIBLE PIPE AND THE FLEXIBLE PIPE

(75) Inventor: Jonas Gudme, Brondby (DK)

(73) Assignee: NKT Flexibles I/S, Brondby (DK)

( * ) Notice: Subject to any disclaimer, the term of this patent is extended or adjusted under 35 U.S.C. 154(b) by 611 days.

(21) Appl. No.: 11/886,647

(22) PCT Filed: Mar. 14, 2006

(86) PCT No.: PCT/DK2006/050007
§ 371 (c)(1),
(2), (4) Date: Dec. 11, 2007

(87) PCT Pub. No.: WO2006/097112
PCT Pub. Date: Sep. 21, 2006

(65) Prior Publication Data
US 2009/0218093 A1 Sep. 3, 2009

(30) Foreign Application Priority Data
Mar. 18, 2005 (DK) .................................. 2005 00397

(51) Int. Cl.
| B32B 3/18 | (2006.01) |
| B32B 1/08 | (2006.01) |
| B32B 7/04 | (2006.01) |
| B32B 15/18 | (2006.01) |
| B65H 81/00 | (2006.01) |
| B29C 53/80 | (2006.01) |
| F16L 9/14 | (2006.01) |
| F16L 9/147 | (2006.01) |

(52) U.S. Cl. ....... 428/626; 428/685; 428/34.1; 428/686; 138/118; 138/118.1; 138/124; 138/129; 138/134; 138/137; 138/139; 137/799; 156/184; 156/428

(58) Field of Classification Search ................... 428/626, 428/34.1, 681, 684, 685, 686
See application file for complete search history.

(56) References Cited

U.S. PATENT DOCUMENTS
4,549,581 A 10/1985 Unno et al.
5,730,188 A 3/1998 Kalman et al.
(Continued)

FOREIGN PATENT DOCUMENTS
FR 2764669 12/1998
(Continued)

OTHER PUBLICATIONS
Machine Translation, Dupoiron, WO 98/57085, Dec. 1998.*
(Continued)

Primary Examiner — Michael La Villa
(74) Attorney, Agent, or Firm — Pearne & Gordon LLP (57) ABSTRACT

The invention relates to a use of a duplex steel for the production of an armouring layer of a flexible pipe comprising at least one unbonded armouring layer and at least one unbonded sealing layer wherein the duplex steel comprises in weight percent
0.01-0.05% by weight of carbon (C)
at least 0.15% by weight of nitrogen (N)
20.0-23.0% by weight of chromium (Cr)
up to 3.0% by weight of nickel (Ni)
up to 1.0% by weight of molybdenum (Mo)
3-6% by weight of manganese (Mn)
up to 1.0% by weight of copper (Cu)
incidental impurities and
balance being iron (Fe).

21 Claims, 2 Drawing Sheets

U.S. PATENT DOCUMENTS

| | | | |
|---|---|---|---|
| 5,813,439 | A | 9/1998 | Herrero et al. |
| 6,085,799 | A | 7/2000 | Kodaissi et al. |
| 6,110,550 | A | 8/2000 | Jarrin et al. |
| 6,123,114 | A | 9/2000 | Seguin et al. |
| 6,192,941 | B1 | 2/2001 | Mallen-Herrero et al. |
| 6,283,161 | B1 | 9/2001 | Feret et al. |
| 6,354,333 | B1 | 3/2002 | Dupoiron et al. |
| 6,408,891 | B1 | 6/2002 | Jung et al. |
| 6,454,897 | B1 | 9/2002 | Morand |
| 6,668,867 | B2 | 12/2003 | Espinasse et al. |
| 6,691,743 | B2 | 2/2004 | Espinasse |
| 6,739,355 | B2 | 5/2004 | Glejbøl et al. |
| 6,840,286 | B2 | 1/2005 | Espinasse et al. |
| 7,069,955 | B2 | 7/2006 | Glejbøl et al. |
| 7,303,213 | B2 | 12/2007 | Rytter |
| 2003/0172999 | A1 | 9/2003 | Alfonsson et al. |
| 2004/0050442 | A1 | 3/2004 | Glejbøl et al. |

FOREIGN PATENT DOCUMENTS

| | | | |
|---|---|---|---|
| WO | WO 98/57085 | * | 12/1998 |
| WO | WO 00/36324 | | 6/2000 |
| WO | WO 01/44531 | A1 | 6/2001 |
| WO | WO 02/27056 | A1 | 4/2002 |
| WO | WO 02/42674 | A1 | 5/2002 |
| WO | WO 03/083344 | A1 | 10/2003 |
| WO | WO 2004/079028 | A1 | 9/2004 |

OTHER PUBLICATIONS

P. Johansson et al, "A new lean duplex stainless steel for construction purposes", ACOM—Avesta Polarit AB, No. 1-2, 2002, pp. 17-23; XP002346574.

* cited by examiner

USE OF A STEEL COMPOSITION FOR THE PRODUCTION OF AN ARMOURING LAYER OF A FLEXIBLE PIPE AND THE FLEXIBLE PIPE

TECHNICAL FIELD

The present invention relates to the use of a steel composition for the production of an armouring layer of an unbonded flexible pipe, a flexible unbonded pipe comprising an armouring layer of said steel composition, and a use of said flexible pipe.

In particular the invention relates to an unbonded flexible pipe for offshore transportation of aggressive fluids, such as hydrocarbon fluids, e.g. crude oil.

BACKGROUND ART

Unbonded flexible pipes for offshore transportation are well known in the art. Such pipes comprise an inner liner which forms a barrier against the outflow of the fluid which is conveyed through the pipe, and one or more armouring layers on the outer side of the inner liner (Outer armouring layer(s)). The flexible pipe may comprise additional layers such as one or more inner armour layers to prevent the collapse of the inner liner. Such inner armouring layer or layers are normally referred to as a carcass. An outer sheath may be provided with the object of forming a barrier against the ingress of fluids from the pipe surroundings to the armour layers.

Typical unbonded flexible pipes are e.g. disclosed in WO0161232A1, U.S. Pat. No. 6,123,114 and U.S. Pat. No. 6,085,799.

The term "unbonded" means in this text that at least two of the layers including the armouring layers and polymer layers are not bonded to each other. In practice the pipe will comprise at least two armouring layers, which are not bonded to each other directly or indirectly via other layers along the pipe. Thereby the pipe becomes bendable and sufficiently flexible to roll up for transportation.

The above-mentioned type of flexible pipes is used, among other things, for off shore as well as some on-shore applications for the transport of fluids and gases. Flexible pipes can e.g. be used for the transportation of fluids where very high or varying water pressures exist along the longitudinal axis of the pipe, such as riser pipes which extend from the seabed up to an installation on or near the surface of the sea, pipes for transportation of liquid and gases between installations, pipes which are located at great depths on the seabed, or between installations near the surface of the sea.

In traditional flexible pipes, the one or more outer armouring layers are most often in the form of helically wound steel wires e.g. shaped as profiles, where the individual layers may be wound at different winding angle relative to the pipe axis. The carcass is typically made from wound stainless steel strips.

A pipe of the above type needs to fulfil a number of requirements. First of all the pipe should have high mechanical strength to withstand the enormous forces it will be subjected to during transportation, laying down and in operation. The internal pressure (from inside of the pipe and outwards) and the external pressure (from outside of the pipe) are very high and may vary considerably. Simultaneously the flexible pipe should be very resistant to corrosive fluids. Furthermore, it is important that the weight is kept sufficiently low as a too high weight may rupture the pipe during laying out, and further the more weight the more expensive the transportation.

In general such pipes are expected to have a lifetime of 20 years in operation.

In order to fulfil these requirement in the prior art flexible pipes, the armouring layers or at least some of the armouring layers were made by high corrosion resistance and/or high strength steel compositions: WO 2004/079028 suggests the use of a stainless steel alloy for offshore use. The steel alloy is selected due to its high corrosion resistance and good mechanical properties.

A commercial product Duplex 2205 marketed by Outokumpu is an embodiment of the disclosure of WO 2004/079028.

The steel alloy of WO 2004/079028 is, however, very expensive due to the high amount of expensive alloy components, such a nickel. The steel alloy of WO 2004/079028 thus comprises at least 4.9% by weight.

In WO 0227056 a steel alloy is suggested for inter alia offshore use, in particular for uses where corrosion conditions are milder. This steel alloy has a low amount of nickel, however, this low nickel content has been compensated by addition of other components. Thus, instead of the nickel, the steel alloy comprises at least 10 Ni-equivalents ($Ni_{eq}$=Ni+0.5Mn+ 30(C+N)+0.5(Cu+Co)).

Co and Cu are relatively expensive alloy components, Mn is known to reduce the corrosive resistivity and should therefore not be present in too large amounts, i.e. it should not be present in an amount above 6% by weight. The amount of carbon should also not be too large, that means not above 0.5% by weight since a larger amount may result in precipitate of carbides which may result in intercrystalline corrosion. The amount of nitrogen should also be kept low, since nitrogen is known to generate porosity in the material, which may be fatal if the material is used in offshore applications, in particular in environments which comprise $H_2S$. Normally it has been desired to avoid nitrogen in the steel material for offshore use e.g. as it is described in U.S. Pat. No. 6,408,891.

DISCLOSURE OF INVENTION

The object of the present invention is to provide an unbonded flexible pipe for offshore transportation which is improved with respect to its balance of the properties corrosion resistance, mechanical strength and cost.

A further object of the invention is to select a steel alloy for use as armour material in an unbonded flexible pipe, which material does not have the drawbacks as mentioned above.

Yet another object of the invention is to provide an unbonded flexible pipe for offshore transportation at deep water, which unbonded flexible pipe is cheaper than prior art deep water unbonded flexible pipes.

These and other objects have been achieved by the invention as it is defined in the claims.

It has thus surprisingly been found that the duplex steel having the composition:
0.01-0.05% by weight of carbon (C)
at least 0.15% by weight of nitrogen (N)
20.0-23.0% by weight of chromium (Cr)
up to 3.0% by weight of nickel (Ni)
up to 1.0% by weight of molybdenum (Mo)
3-6% by weight of manganese (Mn)
Up to 1.0% by weight of copper (Cu)
incidental impurities and
balance being iron (Fe), Against all expectations is as suitable for use in flexible pipes as a steel alloy comprising much larger amounts of expensive alloy components. It has thus been found that in spite of the low content of nickel this duplex steel, in the use as defined in the claims, has both a sufficient mechanical strength and a sufficient resistance to corrosion, even when transporting aggressive fluids and even when used at deep waters.

Furthermore, it has surprisingly been found that the content of nitrogen has no severe effects, and no sensitivity to hydrogen-induced cracking has been observed even when the flexible pipe of the invention has been used in $H_2S$ aggressive environments.

The above duplex steel composition which is used in the present invention is in the following called the "low Ni duplex steel".

As mentioned above, an unbonded flexible pipe may comprise one or more armouring layers. According to the invention the low Ni duplex steel is used for the production of one or more of these armouring layers.

In one embodiment of the invention, the flexible pipe comprises 3 or more unbonded layers including an internal sealing layer, surrounded by two or more outer armouring layers. The low Ni duplex steel may preferably be used for the production of at least one of said outer armouring layers. In general it is often most simple to produce all outer armouring layers from the same material. Thus preferably the low Ni duplex steel is used for all outer armouring layers in this embodiment. The outer armouring layers, as it is well known, comprise an outer sheath.

In one embodiment of the invention, the flexible pipe comprises an internal sealing layer and an inner armouring layer (carcass) inside the internal polymer sealing layer. According to the invention the low Ni duplex steel may preferably be used for the production of this carcass.

Other constructions of the flexible pipe with at least one armouring layer for which the low Ni duplex steel in accordance with the invention may be used in the production of, are described further below.

The low Ni duplex steel has the composition
0.01-0.05% by weight of carbon (C)
at least 0.15% by weight of nitrogen (N)
20.0-23.0% by weight of chromium (Cr)
up to 3.0% by weight of nickel (Ni)
up to 1.0% by weight of molybdenum (Mo)
3-6% by weight of manganese (Mn)
Up to 1.0% by weight of copper (Cu)
incidental impurities and
balance being iron (FE).

All percentages in this disclosure are % by weight unless otherwise specified.

The low Ni duplex steel used according to the invention may preferably have between 40 and 70% by weight of austenite and between 30 and 60% by weight of ferrite. The austenite provides the low Ni duplex steel with its ductile character. Too much austenite may make the steel too ductile, whereas too much ferrite may make the steel too brittle. Preferably the low Ni duplex steel has 45-65% by weight of austenite and 35-55% by weight of ferrite, more preferably the low Ni duplex steel has 50-60% by weight of austenite and 40-50% by weight of ferrite.

In one embodiment, the low Ni duplex steel comprises up to 0.04% by weight of carbon. The amount of carbon should preferably be kept low as an amount above 0.05% by weight may result in precipitation of carbides. A small amount of carbon is, however, desired as carbon contributes to the strength and also is a valuable austenite former. The carbon will in general be located in the austenite phase of the material, since carbon has a very low solubility in the ferrite phase. In a preferred embodiment, the amount of carbon in the low Ni duplex steel is between 0.02 and 0.04% by weight of carbon, such as around 0.03% by weight of carbon.

In one embodiment, the low Ni duplex steel comprises between 0.15 and 0.25% by weight of nitrogen. At levels above about 0.10% by weight it has been found that nitrogen increases the strength and furthers a slight increase in corrosion resistance, particularly resistance to pitting corrosion has also been observed. Nitrogen is an important alloying element as a strong austenitizer. Thus, a too low amount of nitrogen may provide a too little austenite phase. Prior art use of nitrogen containing steel has, however, shown that the nitrogen may result in the formation of pores in the material and formation of stress-corrosion cracking and hydrogen induced cracking when used in corrosive aggressive environments such as in contact with $H_2S$. However, such formations have not been observed in the use of the above composition. It is envisaged that as long as the content is kept below 0.25% by weight of nitrogen, formation of pores, stress-corrosion cracking and hydrogen induced cracking will be negligible.

In a preferred embodiment, the low Ni duplex steel comprises at least 0.18% by weight of nitrogen, preferably at least 0.20% by weight of nitrogen, such as between 0.21 and 0.25% by weight of nitrogen, such as around 0.22% by weight of nitrogen.

Alloys must contain more than 10% by weight of chromium to be classified as a stainless steel. Chromium plays a major role in the corrosion resistance of stainless steels. Generally, increasing chromium content increases corrosion resistance. Chromium also is the most important ferrite former of the steel and, in combination with other ferrite formers and with a balanced content of the austenite formers of the steel, gives a desired duplex character of the steel. If the chromium content is low, there is a risk that the steel will contain martensite, and if the chromium content is high, there is a risk of impaired stability against precipitation of intermetallic phases and so called 475'-embrittlement, and an unbalanced phase composition of the steel.

In one embodiment, the low Ni duplex steel comprises between 21.0 and 22.0% by weight of chromium, such as around 21.5% by weight of chromium.

As mentioned above nickel is a very expensive alloying material. Due to cost the amount of nickel should therefore be kept relatively low while simultaneously ensuring that the mechanical strength and the corrosion resistance are sufficiently high when used according to the present invention.

Nickel is a strong austenite former and has a favourable effect on the ductility of the steel. Nickel is a stabiliser for the duplex structure of the steel and thus nickel is also important for the high corrosive strength as well as mechanical strength.

The low Ni duplex steel should preferably have a nickel content of less than 2.0% by weight, such as around 2.1% by weight or less.

Molybdenum is an optional element in the low Ni duplex steel. Molybdenum may be added to increase resistance to corrosion, particularly in the area of pitting resistance. Molybdenum is, however, also an expensive alloy element. It is therefore desired that the molybdenum content is limited to typical 1.0% by weight. Preferably the low Ni duplex steel comprises less than 0.6% by weight of molybdenum, such as less than 0.3% by weight.

Manganese is an austenitizer in stainless steels with about half the strength of nickel. Manganese, on the other hand, reduces the corrosion resistance of the steel. The amount of manganese should therefore not exceed 6% by weight. Preferably the low Ni duplex steel comprises between 4.0 and 5.5% by weight of manganese, such as around 5.0% by weight of manganese.

Copper may be included in the low Ni duplex steel to improve the corrosion resistance to reducing acids such as sulphuric or to adjust work hardening rates of the austenitic alloys. Copper is an austenitizer in stainless steel with about one-half the strength of nickel. On the other hand, there is a risk of precipitation of copper in case of a too high content thereof, wherefore the copper content should not exceed 1.0% by weight. Copper is also a relatively expensive alloy element, and consequently it is desired to keep the amount of copper low. Preferably the low Ni duplex steel comprises up to 0.6% by weight of copper, such as up to 0.3% by weight of copper. Preferably the duplex steel comprises copper only as an impurity, preferably less than 0.1% by weight.

The duplex steel comprises incidental impurities in an amount of up to 1% by weight in total, such as up to 0.5% by weight in total. The impurity may in one embodiment include up to about 0.9% by weight of Si, such as up to up to about 0.7% by weight of Si. Other impurities include P which should preferably be present in amounts of less than 0.05% by weight, such as about 0.02% by weight or less and S which should preferably be present in less than about 0.01% by weight, such as about 0.002% by weight or less.

The balance is iron, which means that the low Ni duplex steel preferably comprises between 66 and 76% by weight of iron, such as between 69 and 73% by weight of iron, such as between 70 and 73% by weight of iron, such as around 71.5% by weight of iron.

The low Ni duplex steel may in practice be produced using any known methods such as in an electric arc furnace where carbon electrodes contact recycled stainless scrap and various alloys of chromium and nickel, molybdenum and other alloy components. A current is passed through the electrode and the temperature increases to a point where the scrap and alloys melt. Thereafter the molten material may be transferred to a decarbonization vessel, where the carbon levels are reduced. Further alloying additives may be added. Thereafter the molten material may be cast either into ingots or continually cast into a slab or billet form. Then the material may be shaped by hot rolling, cold rolling, drawing or deep drawing into its final form, e.g. as strips or wires.

In one embodiment, the material is subjected to a final annealing to obtain maximum softness and ductility by heat treatment which also produces a homogeneous structure: An annealing relieves stresses that may have built up in the material e.g. during cold working and ensures maximum corrosion resistance. Annealing can produce scale on the surface that must be removed by pickling (an acid wash that removes furnace scale from annealing).

The various methods of producing and shaping the steel are well known in the art.

The steel may preferably be shaped as wires or strips. The shape of such wires and strips used for forming armours of flexible unbonded pipes are well known. Examples can be found in U.S. Pat. Nos. 6,691,743, 6,668,867, 5,813,439, WO 0242674, U.S. Pat. Nos. 5,730,188, 6,354,333, 4,549,581, 6,192,941, 6,283,161, WO 0181809 and WO 0036324, which are hereby incorporated by reference.

The invention also relates to a flexible unbonded pipe comprising at least one armouring layer and at least one sealing layer wherein at least one armouring layer of the flexible pipe is of the low Ni duplex steel as described above.

The sealing layer, often called an inner liner, may preferably be a polymer such as PEX (cross linked polyethylene), polyaminde-11 (PA) and polyvinylidene fluoride (PVDF).

The flexible unbonded pipe of the invention may in principle have any size and length, as it is generally known in the art. Generally such flexible unbonded pipes are of a relatively large dimension, e.g. with inner diameters larger than 2.5 inches (6.5 cm), such as at least 4 inches (10.5 cm) or larger, such as at least 6 inches (15.7 cm) or larger, such as at least 8 inches (20.9 cm) or larger, such as between 10 inches (26.2 cm) and 20 inches(52.3 cm)., such as between 11 inches (28.8 cm) and 18 inches (47.1 cm).

The flexible unbonded pipe of the invention preferably comprises 3 or more unbonded layers including an internal sealing layer, surrounded by two or more outer armouring layers, preferably at least one of said outer armouring layers being of said duplex steel.

In one embodiment, the flexible unbonded pipe comprises an outer sheet surrounding one or more outer armouring layers. The outer sheath may be permeable to gasses and/or liquid. In one embodiment, the outer sheath is liquid tight in order to prevent the ingress of sea water in use.

The outer sheath may e.g. be of a thermoplastic or thermoset material, such as polyethylene (PE) and polyamide (PA), (e.g. nylon 6, nylon 11 or other) and other e.g. as disclosed as materials for outer sheaths in U.S. Pat. No. 4,706,713 and WO 03083344 incorporated by reference.

In general flexible unbonded pipes are divided into two main groups a) flow lines used for transporting fluids along the seabed at seabed level, and b) raisers used for transporting fluids from the seabed level to a higher level e.g. to an installation or a ship at sea surface level.

In one embodiment the flexible unbonded pipe of the invention is a raiser.

In one embodiment the flexible unbonded pipe of the invention is a flow line.

The requirement of the outer armouring layers of a flexible pipe depends largely on the use of the pipe. Use on deeper water normally requires higher strength. The same accounts for use at shallow waving water, in particular if the pipe is a raiser.

The requirement of the material of armouring layers with respect to corrosion resistance depends largely on how corrosive the sea and the fluids to be transported are. In general it is, however, desired that the corrosion resistance of the armouring layers should be relatively high.

The flexible unbonded pipe of the invention may preferably comprise an inner armouring layer (carcass) inside the internal polymer sealing layer.

The use of such carcass is well known in the art. The carcass of a flexible unbonded pipe is in use subjected to the fluid which is transported in the pipe. When transporting aggressive and corrosive fluids such as crude oil, $H_2S$ and similar, the material of the carcass needs to be highly resistive to corrosion. Simultaneously the carcass is subjected to very high forces from the sea water pressing onto the pipe. As long as the pressure inside the pipe is equal to the pressure outside the pipe, the resulting pressure is not too high, but generally there will always be a difference between the inner pressure (inside the pipe) and the outer pressure (outside the pipe), in particular during installation and start up of production. A flexible unbonded pipe for use at deep water, such as about 1000 meters or deeper, is therefore normally equipped with a carcass in order to prevent collapse of the pipe due to the outer pressure onto the pipe. The forces may be very high, which means that the carcass also needs to be of a very strong material. It is therefore very surprising that a flexible unbonded pipe with a carcass of low Ni duplex steel is capable of fulfilling the requirement for use in deep water such as 1000 meters or deeper. In a preferred embodiment, the flexible unbonded pipe of the invention therefore comprises a carcass of the low Ni duplex steel as disclosed above.

The flexible unbonded pipe of the invention may in one embodiment comprise an inner carcass armouring layer and two or more outer armouring layers, wherein the two armouring layers are of wound wires, cross wound at angles of 40-60 degrees, such as 45-58 degrees, such as 53-56 degrees to the centre axis of the pipeline. Preferably two or more of the armouring layers including the carcass are of the low Ni duplex steel.

The flexible unbonded pipe of the invention may in one embodiment comprise an inner carcass armouring layer and three or more outer armouring layers, wherein the inner most of the outer armouring layers is a vault of wound wires, wound at a steep angle to the centre axis of the pipe, e.g. above 80 degree, such as above 90 degree, and the other two armouring layers are of wound wires, cross wound at angles of 30-40, and 70-80 degrees, respectively. Preferably two or more such as all of the armouring layers including the carcass, are of the low Ni duplex steel.

The flexible unbonded pipe of the invention may comprise other layers such as it is well known in the art, e.g. insulation layers of polymers, composite, cork or other, intermediate polymer sheaths or films and etc.

The flexible unbonded pipe of the invention may have a structure as described in any one of the prior art documents U.S. Pat. Nos. 6,691,743, 6,668,867, 5,813,439, WO 0242674, U.S. Pat. Nos. 5,730,188, 6,354,333, 4,549,581, 6,192,941, 6,283,161, WO 0181809, WO 0036324, U.S. Pat. Nos. 6,454,897, 6,408,891 and 6,110,550, with the difference that at least one of the armouring layers is made from the low Ni duplex steel. These prior art documents are hereby incorporated by reference.

In one embodiment of the flexible unbonded pipe of the invention, the one or more armouring layers of the low Ni duplex steel have an average material thickness of between 0.4 and 20 mm, preferably between 0.6 and 15 mm, such as between 8 and 12 mm.

The thickness depends largely on which type of armour layer is in question and how it should be formed. As mentioned above, it is generally known to provide the armour layers from wirers or strips which are wound to form the armour layer(s). Thus, in one embodiment at least one armouring layer of the low Ni duplex steel is made from wires or strips, which have preferably been wound.

In one embodiment of the flexible unbonded pipe, at least one armouring layer of low Ni duplex steel is made from interconnected wire(s), which preferably each have a profile so that the wires are mechanically interconnected. This armour layer may preferably be an outer armour layer.

In one embodiment, the carcass is made from interconnected wires wherein the wires have a K profile as disclosed in WO 0181809.

In one embodiment wherein the armour layer is made from wires of low Ni duplex steel, the wires preferably have an average material thickness of between 1.5 and 15 mm, preferably between 2 and 10 mm. The width of the wires may e.g. be between 7 and 20 mm.

In one embodiment of the flexible unbonded pipe of the invention, at least one armouring layer of low Ni duplex steel is made from strips which have been folded and wound, preferably the folded strips are mechanically interconnected. Preferably the carcass is made from folded and mechanically interconnected strips.

The strips may preferably be folded to have a cross section shaped as a lying S (an endless lying S shape) as it is well known. The strip preferably has an average material thickness of between 0.5 and 5 mm, such as between 0.6 and 3 mm. The material thickness is the thickness of the material in unfolded condition. When unfolded the strips may preferably have a width of 35-180 mm. When folded as a lying S, the width (corresponding to the height of the S) may preferably be between ¼ and ½ of the unfolded width.

The invention also relates to the use of the above described flexible unbonded pipe of the invention for the transportation of hydrocarbon fluids at deep water, preferably deeper than 1000 meters, such as deeper than 1500 meters, wherein the flexible unbonded pipe may be a flow line and/or a raiser.

BRIEF DESCRIPTION OF DRAWINGS

In the following embodiments of the invention are described with reference to the drawings. These embodiments are only examples and should not be interpreted to make any limitation to the scope of the invention. By using his ordinary knowledge the skilled person will know that the disclosed embodiment may be varied while still comprising the elements of the invention.

The figures are schematic and simplified for clarity, and they just show details which are essential to the understanding of the invention, while other details are left out. Throughout, the same reference numerals are used for identical or corresponding parts.

Figure 1:
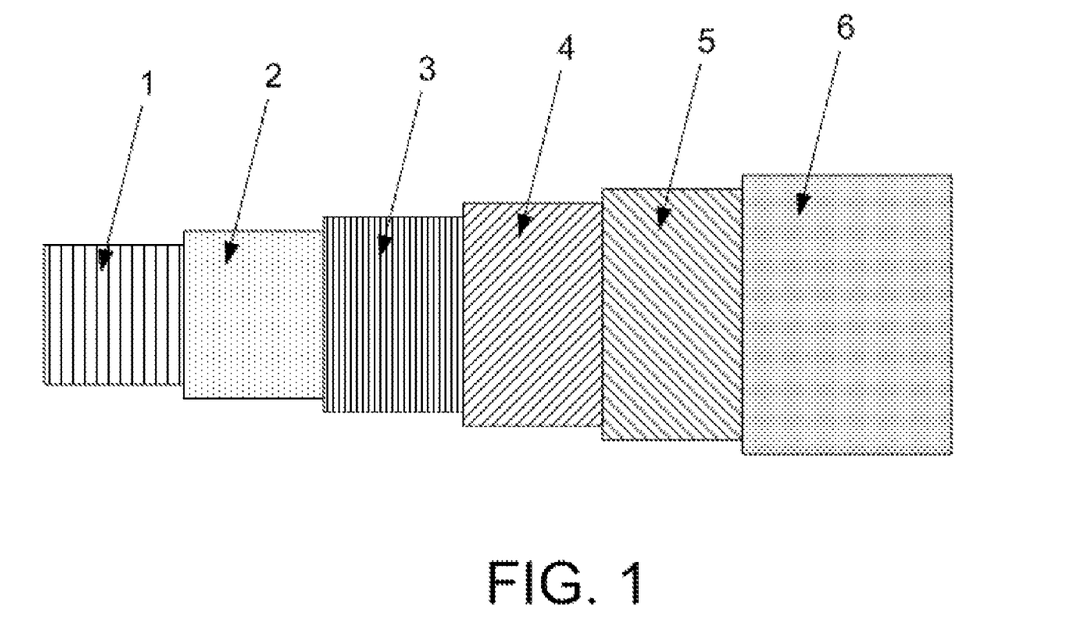
FIG. 1 shows an unbonded pipe with a carcass.

The flexible unbonded pipe shown in FIG. 1 comprises an internal sealing layer 2 also called an inner liner, e.g. of cross linked PE. Inside the inner liner 2 the pipe comprises an inner armouring layer 1, called a carcass. On the outer side of the inner liner 2, the flexible unbonded pipe comprises three outer armouring layers 3, 4, 5. The inner armouring layer 3 closest to the inner liner 2, is a pressure armouring layer 3, made from wires wound at a steep angle to the centre axis of the pipe, e.g. close to 90 degrees. Around the pressure armouring layer 3, the pipe comprises a pair of cross wound tensile armouring layers 4, 5, made from wound wires, wherein one of the tensile armouring layers 4 has an angle above 55 degree, typically between 60 and 75 degrees, and wherein the other one of the tensile armouring layers 5 has an angle below 55 degree, typically between 30 and 45 degrees.

At least one of the armouring layers 2, 3, 4, 5 is made from low Ni duplex steel. Preferably at least the carcass 2 is made from low Ni duplex steel.

Figure 2:
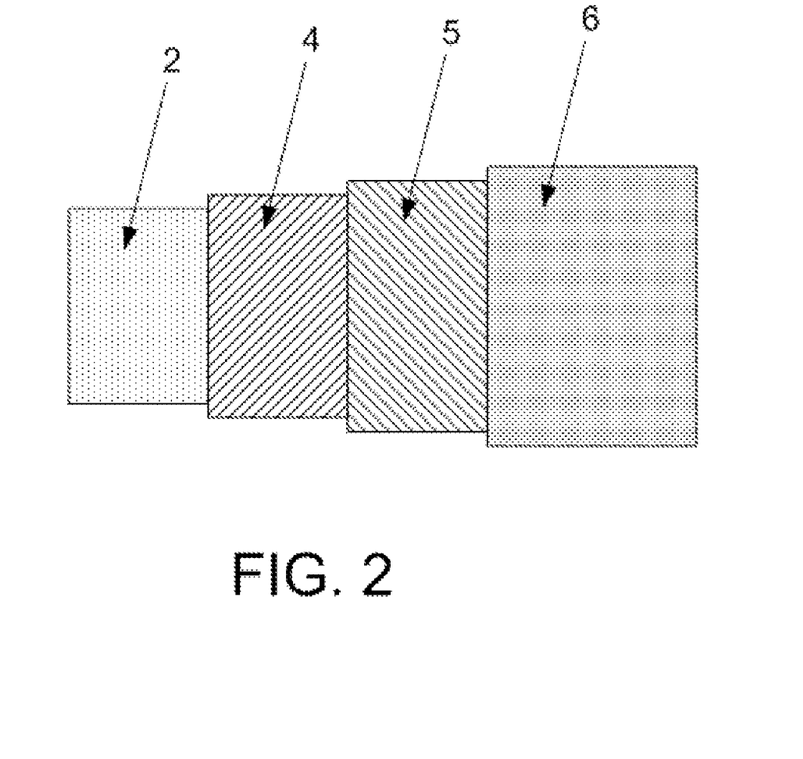
FIG. 2 shows an unbonded pipe without a carcass.

FIG. 2 shows another pipe design. This flexible unbonded pipe comprises an inner liner 12 and a pair of outer armouring layers, 14, 15, in the form of wires wound around the inner liner 12. The two armour layers are cross wound at an angle to the centre axis of the pipe of close to 55 degree, typically one of the layers is wound at an angle slightly less than 55 degrees, e.g. between 52 and 55 degrees and the other of them is wound at an angle slightly more than 55 degrees e.g. between 55 and 57.

At least one of the armouring layers 14, 15 is made from low Ni duplex steel. Preferably both of the armouring layers 14, 15 are made from low Ni duplex steel.

Figure 3:
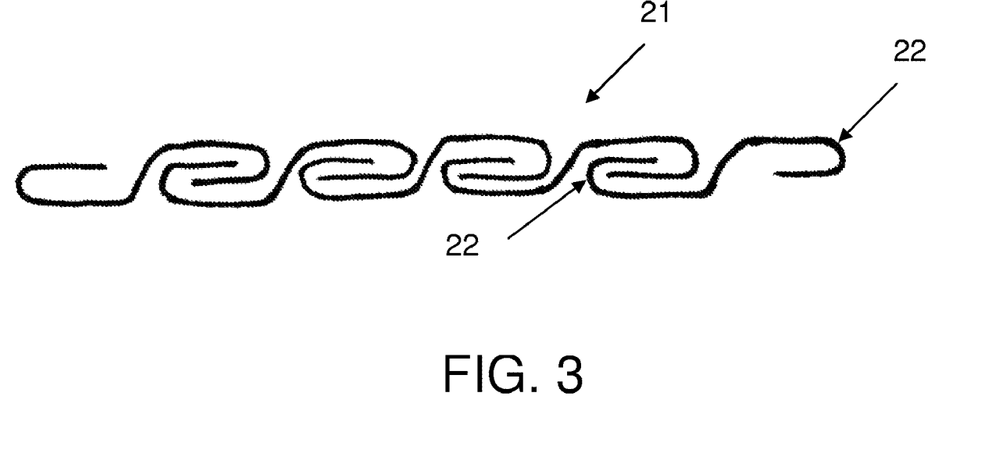
FIG. 3 shows a schematic side view of a folded and wound strip.

FIG. 3 illustrates the folding and winding of a strip to become a carcass. The strip is folded to an endless lying S shape 21. The heads of the S are mechanically interlocked into each other as the folded strip is wound to form a pipe shape. The carcass may be formed from one folded strip or from two or more strips, which are wound and mechanically interlocked.

TEST EXAMPLES

In the following test, three different steel alloys were tested. The steel alloys are shown in table 1.

The steel alloys are commercially available from Outokumpo Stainless Steel Oy, Finland.

TABLE 1

| Product name by Outokumpu | Chemical composition in % by weight - balance being Fe | | | | | |
|---|---|---|---|---|---|---|
| | C | N | Cr | Ni | Mo | Mn |
| LDX 2101 (UNS S32101) | 0.03 | 0.22 | 21.5 | 1.5 | 0.3 | 5 |
| Duplex 2005(UNS S32205) | 0.02 | 0.17 | 22 | 5.7 | 3.1 | 0 |
| 316L (UNS S31603) | 0.02 | 0 | 17.2 | 10.1 | 2.1 | 0 |

Example 1

Six test pipes, each with a length of 8 meters and an inner diameter of 6 inches, were made. The test pipes had a design of the type shown in FIG. 2 but were additionally equipped with a carcass made from steel. The sealing layers and the outer armouring layers were identical in all the test pipes. The carcass was made from either 316L or LDX 2101 (Also called Lean Duplex). The carcass was made from folded and wound strips. Prior to folding the strips had the width and thickness as shown in table 2.

TABLE 2

| Sample | Material | Width mm | Thickness mm | Collapse pressure |
|---|---|---|---|---|
| A | 316L | 1.6 | 55 | 169 |
| B | 316L | 1.6 | 55 | 164 |
| C | 316L | 1.6 | 55 | 161 |
| D | LDX 2101 | 1.5 | 75 | 201 |
| E | LDX 2101 | 1.5 | 75 | 215 |
| F | LDX 2001 | 1.5 | 75 | 211 |

Samples A, B and C were wound with a pitch of 19.1 mm. Samples D, E and F were wound with a pitch of 26.25 mm. The amount of steel material used for the carcass for samples D, E and F was about 7% by weight less than the amount of steel material used for the samples A, B and C.

The pipes were subjected to a collapse test, by inserting the samples into a pressure reactor so that the pipe ends were open to the atmosphere pressure. The pressure in the reactor was raised by about 15 bars/minute, until design pressure, which in this test was set to 100 bars. The pressure was held at 100 bars for 30 minutes. Thereafter the pressure was again continuously raised at a speed of 15 bars/minute until collapse of the pipe.

The results of the collapse test are shown in table 2.

Example 2

Three different materials were tested in the following environment for 720 hours:

| Temperature: | 130° C. |
|---|---|
| $pCO_2$: | 15.5 bara |
| $pH_2S$: | 0.1 bara |
| Chloride: | 30 g/litre |
| Acidity: | 4.0 (Norsok M-506) |

Test Material

Three different materials with carcass geometry were tested as described in table 3.

TABLE 3

| Specimen | Material | Strip |
|---|---|---|
| 1A; 1B; 1C | 2205 Duplex (UNS S32205) | 1.0 mm × 40 mm |
| 2A; 2B; 2C | 316L (UNS S31603) | 0.9 mm × 32 mm |
| 3A; 3B; 3C | LDX2101 (UNS S32101) | 1.6 mm × 55 mm |

Test Environment

Approximately 15 litres of an aqueous solution with the following composition was used:
55 mg/litre $NaHCO_3$
49.5 g/litre NaCl The test temperature was 130° C.

The partial pressure of $CO_2$ was 15.5 bara, and the partial pressure of $H_2S$ was 0.1 bara. pH was calculated to 4.0 using NORSOK M-506.

Test Conduction

Setup

A glass lined autoclave with a total volume of 21.5 litres was used for the test.

Pre Test

Specimens were cut in suitable lengths (5-12 cm) by use of a water-cooled cut-off wheel.

The specimens were cleaned and degreased using the following procedure:
1. Mechanical cleaning in hot water with detergent
2. Exposure to hexane in an ultrasonic sink for 10 minutes
3. Exposure to ethanol in an ultrasonic sink for 10 minutes
4. Exposure to acetone in an ultrasonic sink for 10 minutes After cleaning and drying the length and weight of the specimens were measured and the specimens were placed in the autoclave on a PTFE plate.

15 litres of test solution was prepared in a 20 litre glass reaction vessel using:
742.5 g NaCl
8.25 g $NaHCO_3$
Diluted to 15.0 litres using deionised water.

The glass reactor and the autoclave were connected.

Test

The test solution was deaerated with industrial pure $CO_2$ from Jun. $1^{st}$ 2004 to Jun. $2^{nd}$ 2004. On Jun. $2^{nd}$ 2004 the autoclave and connection strings to the autoclave were evacuated four times in 30 minutes, and filled with $CO_2$ between evacuations. After the last evacuation the test solution was transferred to the autoclave by vacuum.

A special prepared test gas consisting of 0,64% by weight of $H_2S$ in $CO_2$ was used as test gas and bubbled through the test solution for 30 minutes at 13 barg.

The autoclave was heated to a temperature of 130° C., which was reached on Jun. $4^{th}$ 2004 at 08:00. Test gas was bubbled through the test solution for 30 minutes at 17.3 barg, and the test time was started.

The calculated resulting pressures were:

| $CO_2$ | 15.5 bara |
|---|---|
| $H_2S$ | 0.1 bara |
| Vapour pressure of water at 130° C. | 2.7 bara |
| Total absolute pressure | 18.3 bar |
| Target gauge pressure | 17.3 bar |

The pressure and temperature were controlled regularly during the test as well as test gas regularly was bubbled through the test solution. No depressurisation was observed.

On Jul. 5$^{th}$ 2004 the autoclave was allowed to cool resulting in an exposure time exceeding 720 hours. The autoclave was flushed with $CO_2$ before specimens were removed. Specimens were rinsed with water and dried, before they were weighted and examined visually.

Results

The exposed specimens were inspected visually using a low-power binocular microscope. Any general or localised corrosion was reported. In addition specimens were weighted and the corrosion rate determined. The result is found in table 4.

Visual Inspection:

2205 Duplex (UNS S32205)

Two limited corrosion spots were observed.

Specimen No. 1A.

1 small discolouring site and 1 darkened area with corrosion.

Specimens 1B and 1C.

No general or localized corrosion observed.

316L (UNS S31603)

Some areas were darkened from scattered corrosion attacks.

Specimen No. 2A.

1 small discolouring site. Some darkened areas with corrosion.

Specimen No. 2B.

4-5 small discolouring sites. Two darkened areas with corrosion.

Specimen No. 2C.

1 small discolouring site. Some darkened areas with corrosion.

LDX 2101 (UNS S32101)

Some areas were darkened from scattered corrosion attacks.

Specimen No. 3A.

4 small discolouring sites. 2 darkened areas with corrosion.

Specimen No. 3B.

5 darkened areas with corrosion.

Specimen No. 3C.

5-7 darkened areas with corrosion.

| pH$_2$S: | 0.02 bara |
|---|---|
| Chloride: | 50 g/litre |
| Acidity: | 4.0 (Norsok M-506) |

Test Material

Three different materials with carcass geometry were tested as described in table 3 above (as in example 2).

Test Environment

Approximately 15 litres of an aqueous solution with the following composition was used:

5.51 mg/litre NaHCO$_3$ 82.4 g/litre NaCl

The test temperature was 130° C.

The partial pressure of $CO_2$ was 3.1 bara, and the partial pressure of H$_2$S was 0.02 bara. pH was calculated to 4.0 using NORSOK M-506.

Test Conduction

Setup

A glass lined autoclave with a total volume of 21.5 litres was used for the test.

Pre Test

Specimens were cut in suitable lengths (5-12 cm) by use of a water-cooled cut-off wheel.

The specimens were cleaned and degreased using the following procedure:

5. Mechanical cleaning in hot water with detergent
6. Exposure to hexane in an ultrasonic sink for 10 minutes
7. Exposure to ethanol in an ultrasonic sink for 10 minutes
8. Exposure to acetone in an ultrasonic sink for 10 minutes
9. Decontaminated in 15% HNO$_3$ solution for 5 minutes.

After cleaning and drying the length and weight of the specimens were measured (see appendix A), and the specimens were placed in the autoclave on a PTFE plate.

15 litres of test solution was prepared in a 20 litre glass reaction vessel using:

1236 g NaCl 82.65 mg NaHCO$_3$

Diluted to 15.0 litre using deionised water

The glass reactor and the autoclave were connected.

TABLE 4

| Specimen | Length [cm] | Start weight [g] | End weight [g] | Lost weight [g] | Lost weight [‰] | Calculated area [cm$^2$] | Mean corrosion rate [μm/year] | Average corrosion rate all specimens [μm/year] |
|---|---|---|---|---|---|---|---|---|
| 1A | 7.4 | 21.4423 | 21.4388 | 0.0035 | 0.1632 | 59.2 | 0.92 | 1.1 |
| 1B | 7.7 | 22.3328 | 22.328 | 0.0048 | 0.2149 | 61.6 | 1.19 | |
| 1C | 7.6 | 21.9092 | 21.9046 | 0.0046 | 0.2100 | 60.4 | 1.18 | |
| 2A | 8.8 | 18.8505 | 18.8403 | 0.0102 | 0.5411 | 56.3 | 2.80 | 2.7 |
| 2B | 8.5 | 18.2591 | 18.2497 | 0.0094 | 0.5148 | 54.4 | 2.67 | |
| 2C | 9 | 19.174 | 19.1641 | 0.0099 | 0.5163 | 57.3 | 2.66 | |
| 3A | 6 | 40.3639 | 40.3503 | 0.0136 | 0.3369 | 65.5 | 3.19 | 2.9 |
| 3B | 6.8 | 46.1389 | 46.1246 | 0.0143 | 0.3099 | 74.8 | 2.95 | |
| 3C | 6.2 | 35.4109 | 35.4002 | 0.0107 | 0.3022 | 68.2 | 2.43 | |

Example 3

Three different materials for carcass were tested in the following environment for 720 hours:

| Temperature: | 130° C. |
|---|---|
| pCO$_2$: | 3.1 bara |

Test

The test solution was deaerated with industrial pure $CO_2$ from Aug. 18$^{th}$ 2004 to Aug. 19$^{th}$ 2004. On Aug. 19$^{th}$ 2004 the autoclave and connection strings to the autoclave were evacuated four times in 30 minutes, and filled with $CO_2$ between evacuations. After the last evacuation the test solution was transferred to the autoclave by vacuum.

A special prepared test gas consisting of 0.64% $H_2S$ in $CO_2$ was used as test gas and bubbled through the test solution for 30 minutes at 1.5 barg.

The autoclave was heated to a temperature of 130° C., which was reached on Aug. 23$^{rd}$ 2004 at 09:00. Test gas was bubbled through the test solution for 60 minutes at 4.8 barg, and the test time was started.

The calculated resulting pressures were:

| $CO_2$ | 3.1 bara |
|---|---|
| $H_2S$ | 0.02 bara |
| Vapour pressure of water at 130° C. | 2.7 bara |
| Total absolute pressure | 5.8 bar |
| Target gauge pressure | 4.8 bar |

The pressure and temperature were controlled regularly during the test as well as test gas regularly was bubbled through the test solution. No depressurisation was observed.

On Sep. 22$^{nd}$ 2004 the autoclave was allowed to cool resulting in an exposure time exceeding 720 hours. The autoclave was flushed with $CO_2$ before specimens were removed. Specimens were rinsed with water and dried, before they were weighted and examined visually.

Results

The exposed specimens were inspected visually using a low-power binocular microscope. Any general or localised corrosion was reported. In addition specimens were weighted and the corrosion rate determined. The result is found in table 5.

Visual Inspection:

2205 Duplex (UNS S32205)

No general or localized corrosion was observed.

316L (UNS S31603)

No general corrosion and a low occurrence of small discolouring spots and areas were found. Appendix C contains pictures of typical discolouring observed.

Specimen No. 2A.

1 small discolouring site, 2 small areas with discolouring.

Specimen No. 2B.

3 small areas with discolouring.

Specimen No. 2C.

4 small discolouring sites, 1 small area with discolouring.

LDX 2101 (UNS S32101)

No general corrosion and a low occurrence of small discolouring spots and areas were found.

Specimen No. 3A.

2 small discolouring sites+several discoloured sites in the rim.

Specimen No. 3B.

6-7 small discolouring sites and some discolouring areas.

Specimen No. 3C.

3 small discolouring sites and 2 discolouring areas.

TABLE 5

| Specimen | Length [cm] | Start weight [g] | End weight [g] | Lost weight [g] | Lost weight [‰] | Calculated area [cm²] | Mean corrosion rate [µm/year] | Average corrosion rate all specimens [µm/year] |
|---|---|---|---|---|---|---|---|---|
| 1A | 7.8 | 22.5469 | 22.5468 | 0.0001 | 0.0044 | 62.4 | 0.01 | 0.03 |
| 1B | 7.6 | 22.1567 | 22.1565 | 0.0002 | 0.0090 | 60.8 | 0.06 | |
| 1C | 7.8 | 22.6204 | 22.6203 | 0 | 0.0000 | 62.4 | 0.01 | |
| 2A | 7.3 | 15.8953 | 15.8937 | 0.0016 | 0.1007 | 46.7 | 0.54 | 0.48 |
| 2B | 7.3 | 16.1046 | 16.1031 | 0.0015 | 0.0931 | 46.7 | 0.49 | |
| 2C | 7.5 | 16.2674 | 16.2661 | 0.0013 | 0.0799 | 48 | 0.42 | |
| 3A | 6.4 | 43.0229 | 43.02 | 0.0029 | 0.0674 | 70.4 | 0.63 | 0.43 |
| 3B | 7.7 | 52.8938 | 52.8922 | 0.0016 | 0.0302 | 84.7 | 0.29 | |
| 3C | 7.5 | 49.9945 | 49.9925 | 0.002 | 0.0400 | 82.5 | 0.37 | |

The invention claimed is:

1. A method of producing a flexible pipe comprising at least one unbonded armouring layer, at least one unbonded sealing layer comprising an internal sealing layer and comprising an inner armouring layer (carcass) inside the internal sealing layer, the method comprising:
   producing the inner armouring layer from a duplex steel wherein the duplex steel comprises in weight percent:
   0.01-0.05% by weight of carbon (C);
   at least 0.15% by weight of nitrogen (N);
   20.0-23.0% by weight of chromium (Cr);
   up to 3.0% by weight of nickel (Ni);
   up to 1.0% by weight of molybdenum (Mo);
   3-6% by weight of manganese (Mn);
   up to 1.0% by weight of copper (Cu);
   incidental impurities; and
   balance being iron (Fe).

2. The method as claimed in claim 1 wherein the duplex steel comprises in weight percent between 0.02 and 0.04% by weight of carbon.

3. The method as claimed in claim 1 wherein the duplex steel comprises in weight percent at least 0.18% by weight of nitrogen.

4. The method as claimed in claim 1 wherein the duplex steel comprises in weight percent between 21.0 and 22.0% by weight of chromium.

5. The method as claimed in claim 1 wherein the duplex steel comprises in weight percent less than 2.0% by weight of nickel.

6. The method as claimed in claim 1 wherein the duplex steel comprises in weight percent up to 0.6% by weight of molybdenum.

7. The method as claimed in claim 1 wherein the duplex steel comprises in weight percent between 4.0 and 5.5% by weight of manganese.

8. The method as claimed in claim 1 wherein the duplex steel comprises in weight percent up to 0.6% by weight of copper and incidental impurities in an amount of up to 1% by weight in total.

9. The method as claimed in claim 1 wherein the duplex steel comprises in weight percent between 66 and 76% by weight of iron.

10. A flexible pipe comprising:
at least one unbonded armouring layer, least one unbonded sealing layer comprising an internal sealing layer and comprising an inner armouring layer (carcass) inside the internal sealing layer, wherein the inner armouring layer of the flexible pipe is of a duplex steel having the composition in weight percent:
0.01-0.05% by weight of carbon (C);
at least 0.15% by weight of nitrogen (N);
20.0-23.0% by weight of chromium (Cr);
up to 3.0% by weight of nickel (Ni);
up to 1.0% by weight of molybdenum (Mo);
3-6% by weight of manganese (Mn);
up to 1.0% by weight of copper (Cu);
incidental impurities; and
balance being iron (Fe).

11. The flexible pipe as claimed in claim 10 wherein the duplex steel has 40-70% by weight of austenite and 30-60% by weight of ferrite.

12. The flexible pipe as claimed in claim 10 wherein the duplex steel comprises in weight percent between 0.02 and 0.04% by weight of carbon.

13. The flexible pipe as claimed in claim 10 wherein the duplex steel comprises in weight percent at least 0.18% by weight of nitrogen.

14. The flexible pipe as claimed in claim 10 wherein the duplex steel comprises in weight percent between 21.0 and 22.0% by weight of chromium.

15. The flexible pipe as claimed in claim 10 wherein the duplex steel comprises in weight percent less than 2.0% by weight of nickel.

16. The flexible pipe as claimed in claim 10 wherein the duplex steel comprises in weight percent up to 0.6% by weight of molybdenum.

17. The flexible pipe as claimed in claim 10 wherein the duplex steel comprises in weight percent between 4.0 and 5.5% by weight of manganese.

18. The flexible pipe as claimed in claim 10 wherein the duplex steel comprises in weight percent up to 0.6% by weight of copper and incidental impurities in an amount of up to 1% by weight in total.

19. The flexible pipe as claimed in claim 10 wherein the duplex steel comprises in weight percent between 66 and 76% by weight of iron.

20. The flexible pipe as claimed in claim 10 wherein the inner armouring layer of duplex steel is made from wires or strips, which have been wound.

21. A method of transportation of aggressive and corrosive hydrocarbon fluids at deep water, comprising transporting the hydrocarbon fluids from a depth of at least 1000 meters in a flexible pipe comprising:
at least one unbonded armouring layer and at least one unbonded sealing layer comprising an internal sealing layer and comprising an inner armouring layer (carcass) inside the internal sealing layer, wherein the inner armouring layer of the flexible pipe is of a duplex steel having the composition in weight percent:
0.01-0.05% by weight of carbon (C);
at least 0.15% by weight of nitrogen (N);
20.0-23.0% by weight of chromium (Cr);
up to 3.0% by weight of nickel (Ni);
up to 1.0% by weight of molybdenum (Mo);
3-6% by weight of manganese (Mn);
up to 1.0% by weight of copper (Cu);
incidental impurities; and
balance being iron (Fe).

* * * * *

UNITED STATES PATENT AND TRADEMARK OFFICE
CERTIFICATE OF CORRECTION

PATENT NO. : 7,923,126 B2
APPLICATION NO. : 11/886647
DATED : April 12, 2011
INVENTOR(S) : Jonas Gudme It is certified that error appears in the above-identified patent and that said Letters Patent is hereby corrected as shown below:

In the specification, column 9, lines 30-39, replace the current TABLE 2:

TABLE 2

| Sample | Material | Width mm | Thickness mm | Collapse pressure |
|--------|----------|----------|--------------|-------------------|
| A | 316L | 1.6 | 55 | 169 |
| B | 316L | 1.6 | 55 | 164 |
| C | 316L | 1.6 | 55 | 161 |
| D | LDX 2101 | 1.5 | 75 | 201 |
| E | LDX 2101 | 1.5 | 75 | 215 |
| F | LDX 2001 | 1.5 | 75 | 211 | with the following TABLE 2:

TABLE 2

| Sample | Material | Width mm | Thickness mm | Collapse pressure |
|--------|----------|----------|--------------|-------------------|
| A | 316L | 1.6 | 55 | 169 |
| B | 316L | 1.6 | 55 | 164 |
| C | 316L | 1.6 | 55 | 161 |
| D | LDX 2101 | 1.5 | 75 | 201 |
| E | LDX 2101 | 1.5 | 75 | 215 |

In the claims, column 15, line 2, insert the word -- at -- between the word "layer," and "least"

Signed and Sealed this
Twenty-first Day of June, 2011

David J. Kappos
*Director of the United States Patent and Trademark Office*